United States Patent
Yamasaki et al.

(10) Patent No.: US 6,790,161 B2
(45) Date of Patent: Sep. 14, 2004

(54) CLUTCH FOR AUTOMOBILES

(75) Inventors: Masaru Yamasaki, Chiyoda (JP); Kenichiro Tokuo, Chiyoda (JP); Hiroshi Kuroiwa, Hitachi (JP); Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/285,631

(22) Filed: Nov. 1, 2002

(65) Prior Publication Data

US 2003/0166433 A1 Sep. 4, 2003

(30) Foreign Application Priority Data

Mar. 4, 2002 (JP) .......................................... 2002-056726

(51) Int. Cl.⁷ ............................ F16D 11/00; F16D 13/60
(52) U.S. Cl. ................................... 477/181; 192/109 R
(58) Field of Search .................. 477/79, 180; 192/109 R, 192/54.1, 54.2, 150, 55.1, 56.1, 70.28

(56) References Cited

U.S. PATENT DOCUMENTS

| 5,281,190 A | * | 1/1994 | Koivunen ................. 475/116 |
| 5,527,229 A | * | 6/1996 | Ishihara et al. ............ 475/249 |
| 5,931,275 A | * | 8/1999 | Kasuya et al. ........... 192/85 CA |

FOREIGN PATENT DOCUMENTS

JP 2001-099186 4/2001

\* cited by examiner

*Primary Examiner*—Tisha D Lewis
(74) *Attorney, Agent, or Firm*—Antonelli, Terry, Stout & Kraus, LLP

(57) ABSTRACT

A coupling means is provided to act to apply a thrust force generated on a helical gear to a stopper for first transmission members and second transmission members to thereby suppress looseness in the stopper.

7 Claims, 7 Drawing Sheets

CLUTCH FOR AUTOMOBILES

BACKGROUND OF THE INVENTION

The present invention relates to a clutch used in transmissions of automobiles to select a power transmission course.

PRIOR ART

In an automatic transmission for automobiles, a speed change clutch and a start clutch are operated in accordance with a traveling speed of an automobile and output torque of an engine to change speed to a desired speed level. The clutches has a mechanism for pressing input side plates against output side plates to generate a frictional force among the plates to thereby transmit power therebetween. Hereupon, for the purpose of improving the sound stilling property and enhancing strength, a helical gear is used as a gear for transmitting power from a clutch whereby a thrust force is generated due to twist of teeth at the time of transmission of power. Such thrust force has an influence on a pressing force in a clutch to affect power transmitted. Therefore, a system, in which a cushioning member opposing the thrust force is provided, has been devised.

As a conventional example, JP-A-2001-99186 discloses a clutch comprising a helical gear rotatably mounted on a shaft and a clutch mechanism provided on the shaft to make engagement and disengagement of the helical gear from the shaft, wherein a cushioning member opposing a thrust force is provided on a thrust bearing part for rotatably holding the helical gear in a predetermined position on the shaft in an axial direction. According to such a clutch, in the case where the helical gear tends to be moved axially by a thrust force generated when the helical gear transmits power, the cushioning member inhibits movement of the helical gear to prevent vibrations and inclination of the helical gear, thus making an operation of the clutch stable.

According to the above clutch, it is possible to cushion vibrations and inclination of the helical gear, but the clutch will bear a thrust force varying according to power transmitted by the helical gear. While the clutch regulates power transmitted depending upon pressing forces between transmission members, the pressing forces are affected by the varying thrust force whereby transmitting power is in some cases varied. Thus, it is necessary to cause the clutch to operate so as to eliminate such influences.

BRIEF SUMMARY OF THE INVENTION

An object of the invention is to provide a clutch with good controllability, in which influences of a thrust force are eliminated as well as those due to vibrations and inclination of a helical gear.

Under the object, according to the present invention, there is provided a clutch for automobiles, comprising a first transmission member mounted on a shaft to be constrained in a direction of rotation; a second transmission member arranged to be coaxial with the first transmission member, a helical gear, which is arranged to be coaxial with the second transmission member and on which the second transmission member are provided to be constrained in a direction of rotation; an actuator for controlling a state of contact between the first transmission member and the second transmission member; and a stopper restricting positions of the first transmission member and the second transmission member in an axial direction, wherein there is provided a transmission course which is distinguished from the first and second transmission members and through which a thrust force generated on the helical gear or an axial movement of the helical gear is transmitted to the stopper.

Other objects, features and advantages of the invention will become apparent from the following description of the embodiments of the invention taken in conjunction with the accompanying drawings.

BRIEF DESCRIPTION OF EMBODIMENTS OF THE INVENTION

An embodiment of the invention will be described below with reference to FIGS. 1 and 2.

Figure 1:
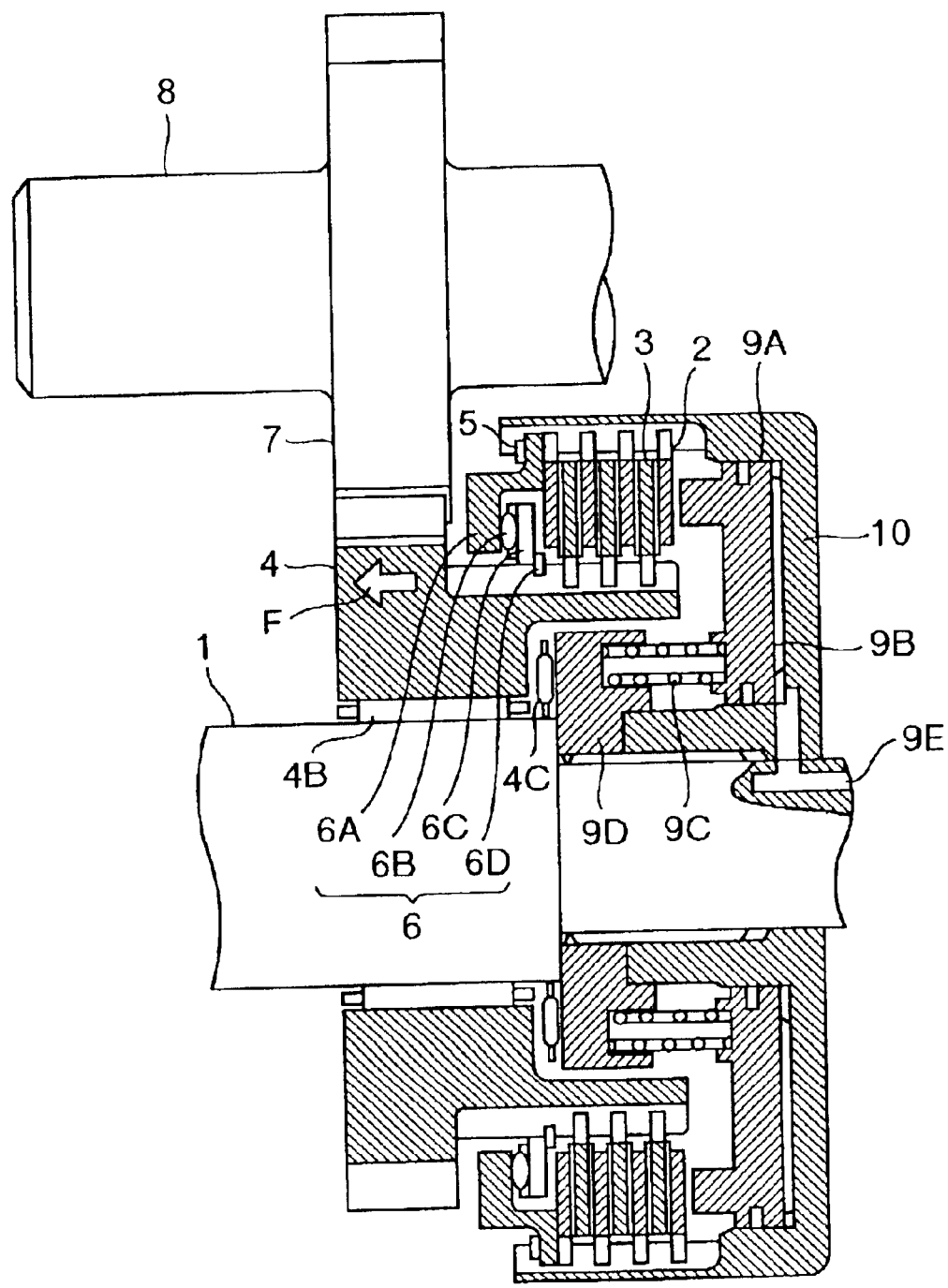
FIG. 1 is a view schematically showing an embodiment of a power device having a clutch according to the invention.

FIG. 1 shows a clutch in cross section. A helical gear 4 is supported on a power transmission shaft (or a first shaft) 1 through a needle bearing 4B to be free in a direction of rotation, and meshes with a gear 7 toothed on a sub-shaft (or a second shaft) 8. A drum 10 is mounted to mesh with splines toothed on the power transmission shaft 1, and the power transmission shaft 1 and the drum 10 rotate together.

Teeth supporting the first transmission members 2 are toothed on an inner surface of the drum 10. The first transmission members comprise a disk-shaped plate formed centrally thereof with a hole, toothed on an outer peripheral surface of which plate are teeth adapted to mesh with the drum 10 and which plate is mounted inside the drum 10. That is, the teeth on the drum 10 and the teeth on the first transmission members 2 mesh with each other, the first transmission members 2 being held in a state, in which they are freely movable relative to the drum 10 in an axial direction but constrained in a rotational direction of the drum.

Second transmission members 3 comprise a disk-shaped plate formed centrally thereof with a hole, and a friction material applied on both sides of the plate, the plate being formed on an inner peripheral surface thereof with teeth, which are adapted to mesh with teeth toothed on the helical gear 4. That is, the teeth of the helical gear 4 and the teeth of the second transmission members 3 mesh with each other, the second transmission members 3 being held in a state, in which they are freely movable relative to the helical gear 4 in an axial direction but constrained in a rotational direction.

In addition, while there is provided a multiple disk clutch making use of the first transmission members 2 being four in number and the second transmission members 3 being three in number in the present embodiment, any number of the respective transmission members will do.

A groove extending over an entire circumference of the drum is formed on ends of the teeth of the drum 10, which hold the first transmission members 2, and a ring-shaped stopper 5 is fitted into the groove to restrict axial movement of the first transmission members 2. A groove extending over an entire circumference of the helical gear is formed on ends of the teeth of the helical gear 4, which hold the second transmission members 3, and a ring 6D is fitted into the groove. Hereupon, thrust force coupling means 6 composed of a connection ring 6A, thrust bearing 6B, and a washer 6C is provided between the stopper 5 and the ring 6D.

A force tending to move the helical gear due to a thrust force F generated upon meshing of the helical gear with the gear 7 when the helical gear 4 transmits power is transmitted to the stopper 5 by the coupling means 6. At this time, the stopper 5 is mounted in a manner to receive a force from the coupling means so as to be directed toward a location where it should be positioned in the case where the clutch is put in a state of transmission of power.

The coupling means 6 is of an engagement member composed of a plurality of coupling members (6A, 6B, 6C, 6D) to engage with the helical gear 4 and the stopper 5, and defines a transmission course distinguished from the first and second transmission members 2, 3 and serving to transmit a thrust force or an axial movement of the helical gear 4 to the stopper 5, the thrust force being generated on the helical gear 4.

In order to afford transmission of power between the first transmission members 2 and the second transmission members 3, a torus-shaped hydraulic piston 9A is mounted in the drum 10 to serve as an operating means (actuator) for pressing these members together.

When a high pressure working oil is fed to a working chamber 9B defined by the hydraulic piston 9A and an inside of the drum 10, the hydraulic piston 9A is moved toward the first transmission members 2 to generate a force for pressing of the first transmission members 2. A return spring 9C is mounted between a return spring holding mechanism 9D and the hydraulic piston 9A to push back the hydraulic piston in a direction away from the first transmission members when a high pressure working oil is not fed to the working chamber 9B. The high pressure working oil is fed from a hydraulic pressure supplying means (not shown) through a hydraulic pressure passage 9E formed in the power transmission shaft 1.

An explanation will be given to a motion of the clutch.

First, when a high pressure working oil is not fed to the working chamber 9B on the hydraulic piston 9A, the first transmission members 2 and the second transmission members 3 transmit some power therebetween due to friction therebetween but the power is at a negligible level. Accordingly, no power is transmitted between the drum 10 fixed relative to the first transmission members 2 in a direction of rotation and the power transmission shaft 1, and the helical gear 4 fixed relative to the second transmission members 3 in a direction of rotation to allow the power transmission shaft 1 and the helical gear 4 to freely rotate relative to each other, and so no power is transmitted between the sub-shaft 8 having the gear 7 meshing with the helical gear 4 and the power transmission shaft 1.

When a high pressure working oil is fed to the working chamber 9B, the hydraulic piston 9A is applied by a force produced by hydraulic pressure to be moved toward the first transmission members 2 to press the first transmission members 2. The stopper 5 is mounted on an opposite side of the first transmission members 2 to the hydraulic piston 9A to restrict an amount of movement of the first transmission members (the axial position is limited), so that the first transmission members 2 and the second transmission members 3 are interposed between the hydraulic piston 9A and the stopper 5 to be increased in contact force therebetween.

As the contact force between the first transmission members and the second transmission members is increased, power begins to be transmitted between the first transmission members and the second transmission members, so that power is transmitted between the power transmission shaft 1 and the helical gear 4, which are fixed relative to the first and second transmission members, respectively, in the direction of rotation. In this manner, power is transmitted between the sub-shaft 8 having the gear 7 meshing with the helical gear 4 and the power transmission shaft 1.

Here, in an initial stage of transmission of power, power transmitted is gradually increased after pressing by the hydraulic piston 9A begins. In this stage, in which the power gradually transmitted is increased, the thrust force F generated by transmission of power through the helical gear is transmitted to the stopper 5 by the coupling means 6 to act in a manner to press the stopper 5 to a predetermined position. This takes effect in reducing dispersion in motions of the first transmission members and the second transmission members, which are interposed between the stopper 5 and the hydraulic piston 9A to act, through pressing of the stopper to the predetermined position in the initial stage of transmission of power because the stopper 5 is uncertain in position due to the machining accuracy and assembling accuracy of the stopper 5 itself, or the like.

In addition, it is supposed that when power is transmitted to the sub-shaft 8 from the power transmission shaft 1 to rotatingly drive the sub-shaft 8, the first transmission members 2 and the second transmission members 3 are put in a substantially coupled state, and that when power as transmitted is negligible, the first transmission members 2 and the second transmission members 3 are put in a state (non-coupled state) substantially released from the coupled state.

Figure 2:
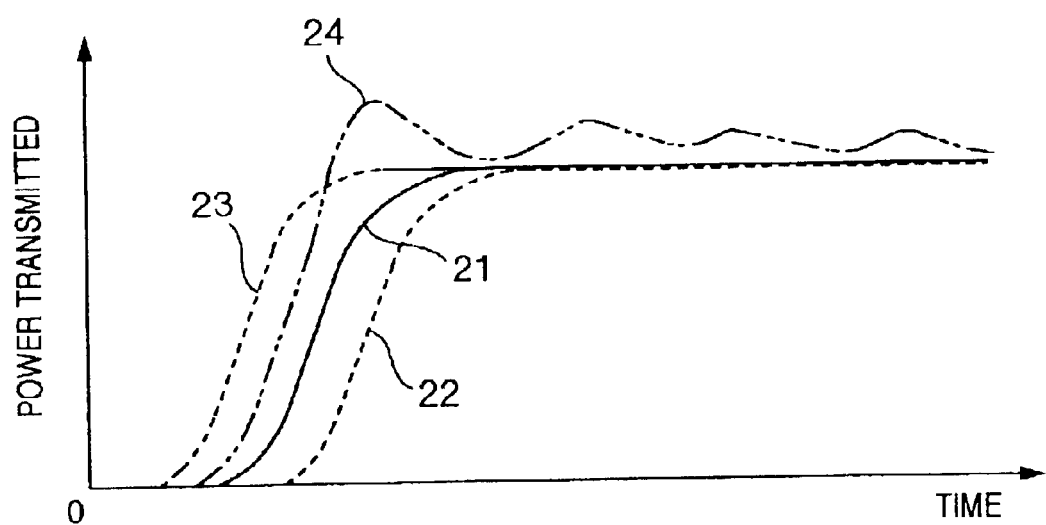
FIG. 2 is a view showing timing, in which power transmitted by a clutch according to the invention rises, as compared with timing, in which power transmitted by a clutch of the prior art rises.

FIG. 2 shows variation in transmission of power made by the clutch in an initial stage. In the case where the coupling means 6 is not provided and the stopper 5 is not pressed to a predetermined position, the stopper 5 becomes uncertain in position whereby timing, in which transmitted power rises in an initial stage, is out of order (22, 23), and transmitted power rises excessively and pulsates in a steady state (24). In contrast, in the case where the coupling means 6 is provided and the stopper 5 is pressed to a predetermined position, timing, in which transmitted power rises in an initial stage, becomes constant and is free from becoming out of order, and transmitted power does not rise excessively (21).

As described above, it is possible according to the embodiment to constitute a clutch of good controllability, in which a thrust force generated on the helical gear 4 is made use of to cause the coupling means 6 to press the stopper 5 to a predetermined position whereby dispersion in motion of the clutch can be reduced and transmitted power rises in the same timing every time.

An explanation will be given to another embodiment of the invention with reference to FIG. 3.

Figure 3:
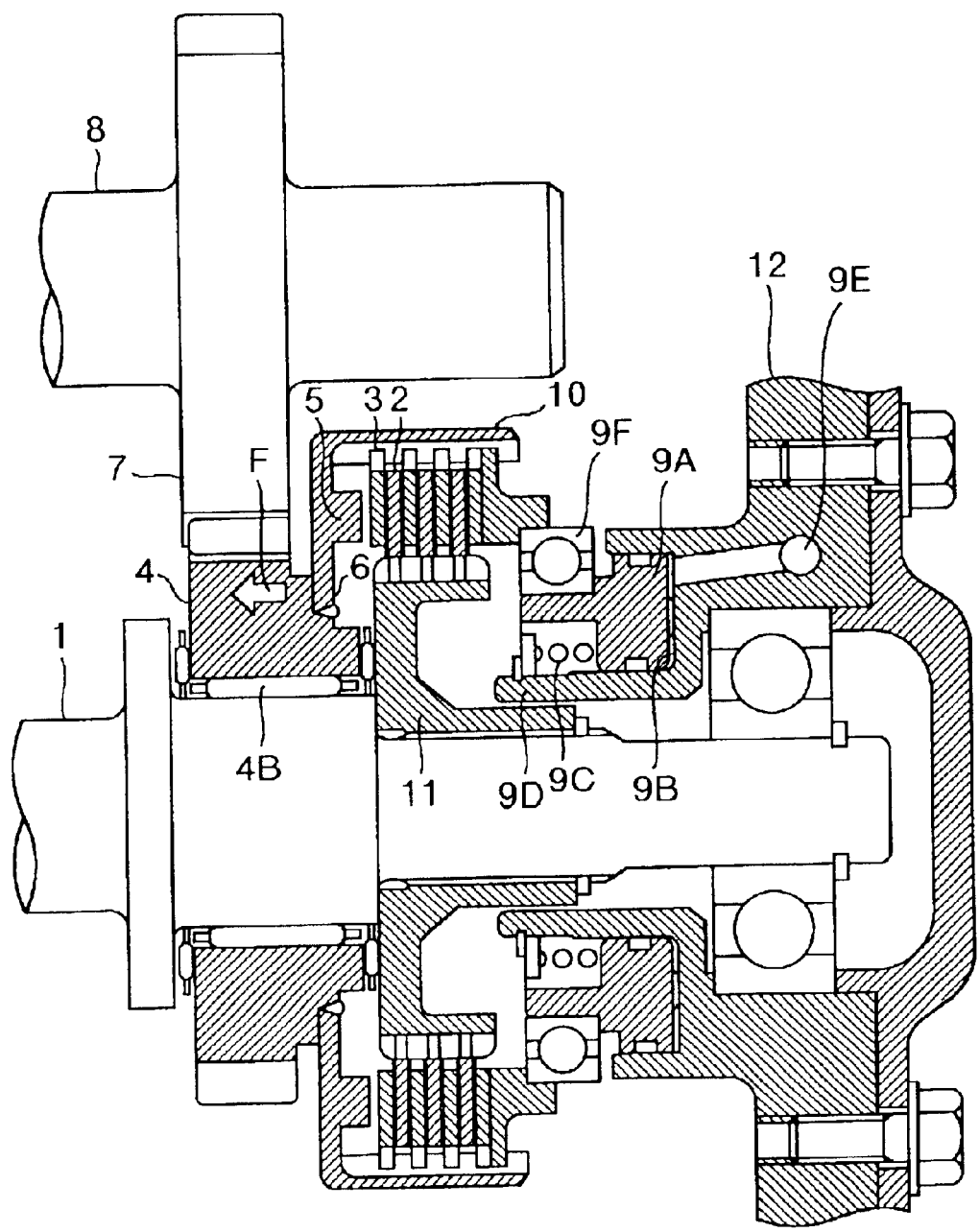
FIG. 3 is a view schematically showing a further embodiment of a power device having a clutch according to the invention.

FIG. 3 shows in cross section a clutch according to the invention. A helical gear 4 is supported on a power transmission shaft 1 through a needle bearing 4B to be free in a direction of rotation, and meshes with a gear 7 toothed on a sub-shaft 8. A hub 11 is mounted to mesh with splines toothed on the power transmission shaft 1, and the power transmission shaft 1 and the hub 11 rotate together. Teeth supporting the first transmission members 2 are toothed on the hub 11.

The first transmission members comprise a disk-shaped plate formed centrally thereof with a hole, and a friction material applied on both sides of the plate, the plate being formed on an inner peripheral surface thereof with teeth, which are adapted to mesh with the hub 11, and mounted on the hub 11. That is, the teeth of the hub 11 and the teeth of the first transmission members 2 mesh with each other, the first transmission members 2 being held in a state, in which they are freely movable relative to the hub 11 in an axial direction but constrained in a rotational direction of the hub.

Second transmission members 3 comprise a disk-shaped plate formed centrally thereof with a hole, toothed on an outer peripheral surface of which plate are teeth adapted to mesh with teeth toothed on the drum 10. That is, the teeth on the drum 10 and the teeth on the second transmission members 3 mesh with each other, the second transmission members 3 being held in a state, in which they are freely movable relative to the drum 10 in an axial direction but constrained in a rotational direction of the drum.

While there is provided a multiple disk clutch making use of the first transmission members 2 being three in number and the second transmission members being four in number in the present embodiment, any number of the respective transmission members will do.

The drum 10 together with a coupling means 6 is weld to the helical gear 4 to freely rotate relative to the power transmission shaft 1 together with the helical gear 4. Also, the coupling means 6 is provided with a projection, which constitutes a stopper 5 for restricting axial movement of the first transmission members.

When a thrust force F generated when the helical gear 4 transmits power tends to cause the helical gear 4 to move, the coupling means 6 and the stopper 5 are unitary with each othere to thereby move at the same time, and the stopper 5 is constituted in a manner to be directed toward a location where it should be positioned in the case where the clutch is put in a state of transmission of power.

In order to afford transmission of power between the first transmission members 2 and the second transmission members 3, a torus-shaped hydraulic piston 9A is mounted in a casing 12 to serve as an operating means (actuator) for pressing these members together. When a high pressure working oil is fed to a working chamber 9B defined by the hydraulic piston 9A and the casing 12, the hydraulic piston 9A is moved toward the second transmission members 3 to generate a force for pressing of the second transmission members 3. A return spring 9C is mounted between a return spring holding mechanism 9D and the hydraulic piston 9A to push back the hydraulic piston in a direction away from the second transmission members 3 when a high pressure working oil is not fed to the working chamber 9B. The high pressure working oil is fed from a hydraulic pressure supplying means (not shown) through a hydraulic pressure passage 9E formed in the casing 12.

An explanation will be given to a motion of the clutch according to the present embodiment.

First, when a high pressure working oil is not fed to the working chamber 9B on the hydraulic piston 9A, the first transmission members 2 and the second transmission members 3 transmit some power therebetween due to friction therebetween but the power is at a negligible level. Accordingly, no power is transmitted between the hub 11 fixed relative to the first transmission members 2 in a direction of rotation and the power transmission shaft 1, and the drum 10 fixed relative to the second transmission members 3 in a direction of rotation and the helical gear 4 to allow the power transmission shaft 1 and the helical gear 4 to freely rotate relative to each other, and so no power is transmitted between the sub-shaft 8 having the gear 7 meshing with the helical gear 4 and the power transmission shaft 1.

When a high pressure working oil is fed to the working chamber 9B, the hydraulic piston 9A is applied by a force produced by hydraulic pressure to be moved toward the second transmission members 3 for pressing of the second transmission members 3. The stopper 5 is mounted on an opposite side of the first transmission members to the hydraulic piston 9A to restrict an amount of movement of the first transmission members, so that the first transmission members and the second transmission members are interposed between the hydraulic piston 9A and the stopper to be increased in contact force therebetween. As the contact force between the first transmission members 2 and the second transmission members 3 is increased, power begins to be transmitted between the first transmission members 2 and the second transmission members 3, so that power is transmitted between the power transmission shaft 1 and the helical gear 4, which are fixed relative to the first and second transmission members, respectively, in the direction of rotation.

In this manner, power is transmitted between the sub-shaft 8 having the gear 7 meshing with the helical gear 4 and the power transmission shaft 1. Here, in an initial stage of transmission of power, power transmitted is gradually increased after pressing by the hydraulic piston 9A begins. In this stage, in which the power gradually transmitted is increased, the thrust force F generated by transmission of power through the helical gear acts in a manner to press the stopper 5 to a predetermined position when the helical gear is moving toward the predetermined position because the helical gear, the coupling means 6 and the stopper 5 are unitary together.

This takes effect in reducing dispersion in rise of power transmitted through the first transmission members 2 and the second transmission members 3, which are interposed between the stopper 5 and the hydraulic piston 9A to act.

It is possible according to the embodiment to constitute a clutch of good controllability, in which the coupling means 6, the stopper 5 and the helical gear 4 are unitary together, a thrust force generated on the helical gear 4 is made use of to press the stopper 5 to a predetermined position whereby dispersion in motion of the clutch can be reduced and power transmitted rises in the same timing every time.

An explanation will be given to a further embodiment of the invention with reference to FIG. 4.

Figure 4:
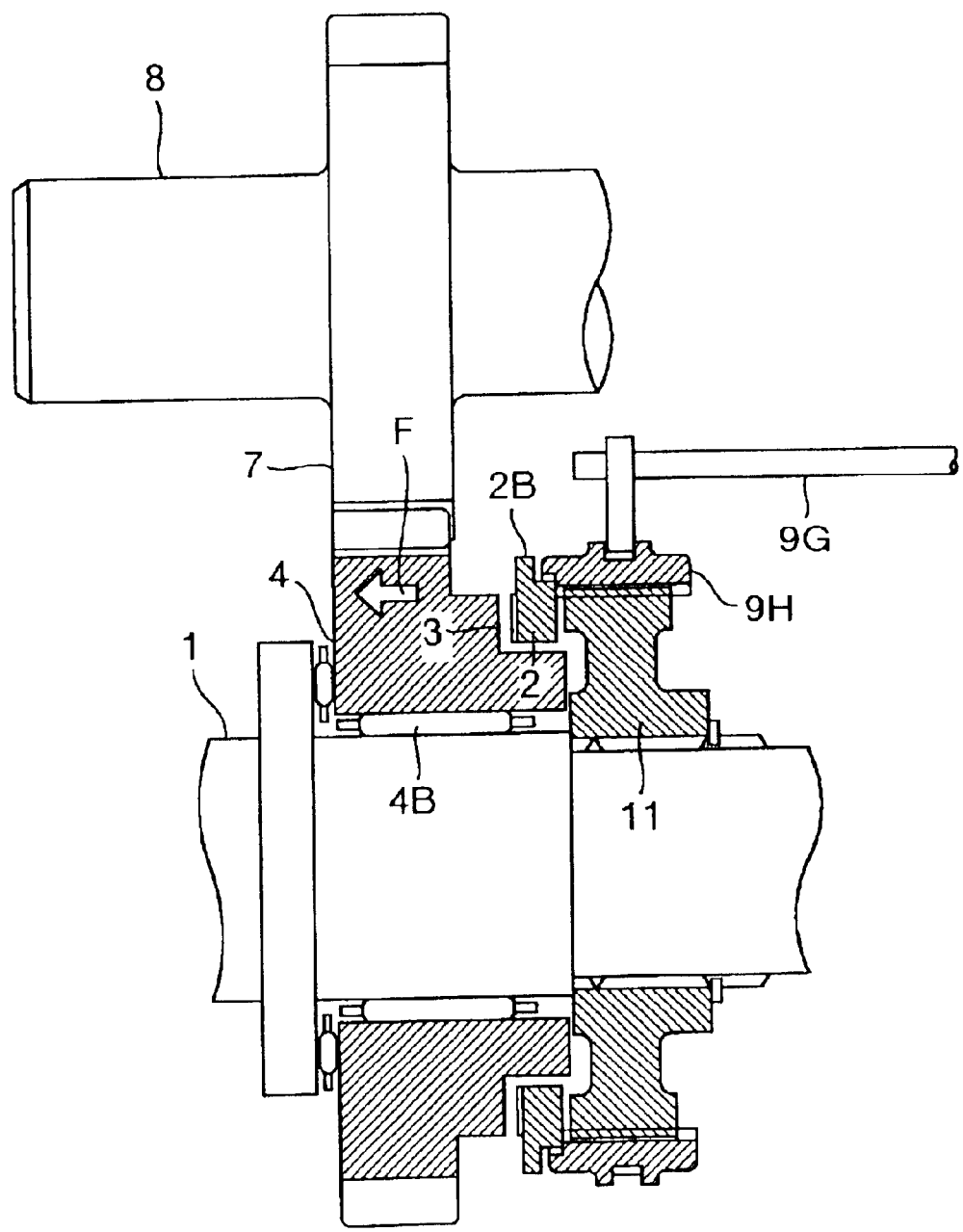
FIG. 4 is a view schematically showing a still further embodiment of a power device having a clutch according to the invention.

FIG. 4 shows in cross section a clutch according to the invention. A helical gear 4 is supported on a power transmission shaft 1 through a needle bearing 4B to be free in a direction of rotation, and meshes with a gear 7 toothed on a sub-shaft 8. A hub 11 is mounted to mesh with splines toothed on the power transmission shaft 1, and the power transmission shaft 1 and the hub 11 rotate together.

Splines are further toothed on an outer peripheral surface of the hub 11, and a torus-shaped sleeve 9H is mounted to mesh with the splines. Here, splines on the hub 11 and the sleeve 9H permit the sleeve 9H to freely move axially.

A first transmission member 2 is mounted between the helical gear 4 and the hub 11, and splines are toothed on an outer peripheral surface of the first transmission member 2 to mesh with the splines on the sleeve 9H. Here, a contact portion 2B of the first transmission member 2 adapted to contact with the sleeve 9H is shaped to restrict axial movements of the both members such that when the sleeve 9H moves toward the first transmission member 2, the contact portion 2B contacts therewith and so the sleeve 9H and the first transmission member 2 move unitarily.

The sleeve 9H can be operatively moved axially by a rod 9G. Also, formed on a contact surface of the helical gear 4, which is adapted to contact with the first transmission member 2, is a second transmission member 3 integral with the helical gear 4. That is, the second transmission member 3 and the helical gear 4 are formed on the same (one) member.

Also, since the second transmission member 3 is formed on the same (one) member as that of the helical gear 4, a stopper 5 in the above embodiment will be also formed on the same (one) member as that of the helical gear 4, in which case a transmission course to transmit a thrust force or movement of the helical gear 4 to the stopper 5 is defined in a member that forms the helical gear 4.

In addition, while there is provided a single disk clutch making use of the first transmission member 2 being one in number and the second transmission member being one in number in the present embodiment, any number of the respective transmission members will do provided that the second transmission member 3 closest to the helical gear 4 is formed integral with the helical gear 4. Also, the rod 9G is operated by a control means (not shown).

An explanation will be given to a motion of the clutch according to the present embodiment.

First, when the rod 9G is not operated, the first transmission member 2 and the second transmission member 3 transmit some power therebetween due to friction therebetween but the power is at a negligible level. Accordingly, no power is transmitted between the sleeve 9 fixed relative to the first transmission member 2 in a direction of rotation, the hub 11 and the power transmission shaft 1, and the helical gear 4 fixed relative to the second transmission member 3 in a direction of rotation to allow the power transmission shaft 1 and the helical gear 4 to freely rotate relative to each other, and so no power is transmitted between a sub-shaft 8 having a gear 7 meshing with the helical gear 4 and the power transmission shaft 1.

When the rod 9G is operated to press the sleeve 9H toward the helical gear 4, the first transmission member 2 is pushed by the sleeve 9H to begin contacting with the second transmission member 3 whereby a contact force therebetween is increased. As the contact force between the first transmission member 2 and the second transmission member 3 is increased, power is transmitted between the first transmission member 2 and the second transmission member 3, so that power is transmitted between the power transmission shaft 1 and the helical gear 4, which are fixed relative to the first and second transmission members, respectively, in the direction of rotation. In this manner, power is transmitted between the sub-shaft 8 having the gear 7 meshing with the helical gear 4 and the power transmission shaft 1.

Here, in an initial stage of power transmission, power transmitted is gradually increased after pressing by the rod 9G begins. In this stage, in which the power gradually transmitted is increased, a thrust force F generated by power transmitted through the helical gear acts in a manner to press the second transmission member 3 to a predetermined position when the helical gear is moving toward the predetermined position because the helical gear and the second transmission member 3 are unitary together. This takes effect in reducing dispersion in rise of power transmitted by contact between the first transmission member 2 and the second transmission member 3.

An explanation will be given to a still further embodiment with reference to FIG. 5.

Figure 5:
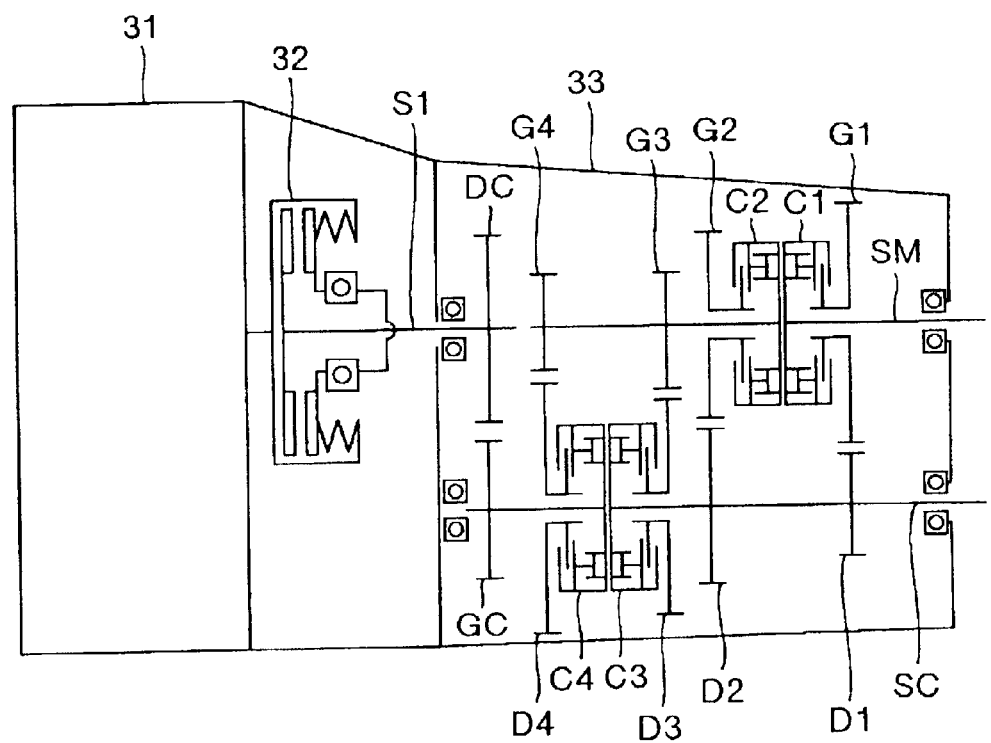
FIG. 5 is a view schematically showing an embodiment of an automatic transmission for automobiles, having a clutch according to the invention.

FIG. 5 shows a configuration example, in which the clutch according to the invention is used for a variable speed clutch in an automatic transmission for automobiles.

Output of an engine 31 is transmitted to a start clutch 32, and releasing and coupling motions of the start clutch 32 are controlled by an actuator (not shown). When the start clutch 32 is put in a coupled state, output of the engine 31 is transmitted to an input shaft SI of a transmission 33. Arranged in the transmission 33 are a counter shaft SC and a main shaft SM, from which main shaft SM power is output to drive wheels (not shown) of an automobile.

Rotation of the input shaft SI is transmitted to the counter shaft SC by a reduction gear set (DC, GC) within the transmission, and power is transmitted to the main shaft from the counter shaft through gear sets (D1-G1, D2-G2, D3-G3, D4-G4), which effect speed reduction (speed increase) conformed to respective speed levels.

The gear sets conformed to the respective speed levels are mounted in a manner to be able to idle on either of the counter shaft SC and the main shaft SM, and the clutches (C1, C2, C3, C4) according to the invention are used to control transmission of power between idling gears and an associated shaft. A working oil fed from a hydraulic control unit (not shown) actuates hydraulic pistons to control power transmitted by the respective clutches. Here, gears for reverse travel, gears for fourth or higher speeds, and power transmission courses therefor are not shown.

An explanation will be given below to a motion of the clutch according to the invention constructed above. Since the clutches C1 to C4 are the same in motion, however, an explanation will be given to only a motion in the case where the first speed is changed to the second speed.

When traveling at the first speed, the clutch C1 for the first speed is put in a coupled state, and so power of the engine 31 is transmitted via a path, which traces the start clutch 32, input shaft SI, reduction gear set (DC, GC), counter shaft SC, first-speed reduction gear set (D1-G1), first-speed clutch C1, and the main shaft SM.

When changing to the second speed, the second-speed clutch C2 is put in a coupled state while the first-speed clutch C1 is being released, and a path for transmission of power is gradually shifted to a path, which traces the start clutch 32, input shaft SI, reduction gear set (DC, GC), counter shaft SC, second-speed reduction gear set (D2-G2), second-speed clutch C2, and the main shaft SM.

In effect, in changing of speed, the path for transmission of power is shifted by putting the second-speed clutch C2 in a coupled state in a timing, in which the first-speed clutch C1 is released. Here, when the timing for coupling of the second-speed clutch is not appropriate, there are caused a locked state, in which the first-speed and second-speed gears effect simultaneous gearing, and a shut-off state, in which the path for transmission of power is shut off due to simultaneous release, whereby power output from the main shaft SM is much varied, which greatly degrades the speed changing performance of an associated automatic transmission.

Since the use of the clutch according to the invention makes it possible to suppress a coupling timing of a second-speed clutch to a predetermined level, it is possible to prevent a locked state due to simultaneous gearing and a shut-off state of a power transmission course due to simultaneous release.

As described above, it is possible according to the embodiment to suppress a coupling timing of a clutch to a predetermined level, so that it is possible to prevent variation in power output from the main shaft SM and to constitute an automatic transmission of high quality for automobiles.

An explanation will be given to a still further embodiment with reference to FIGS. 6 and 7.

Figure 6:
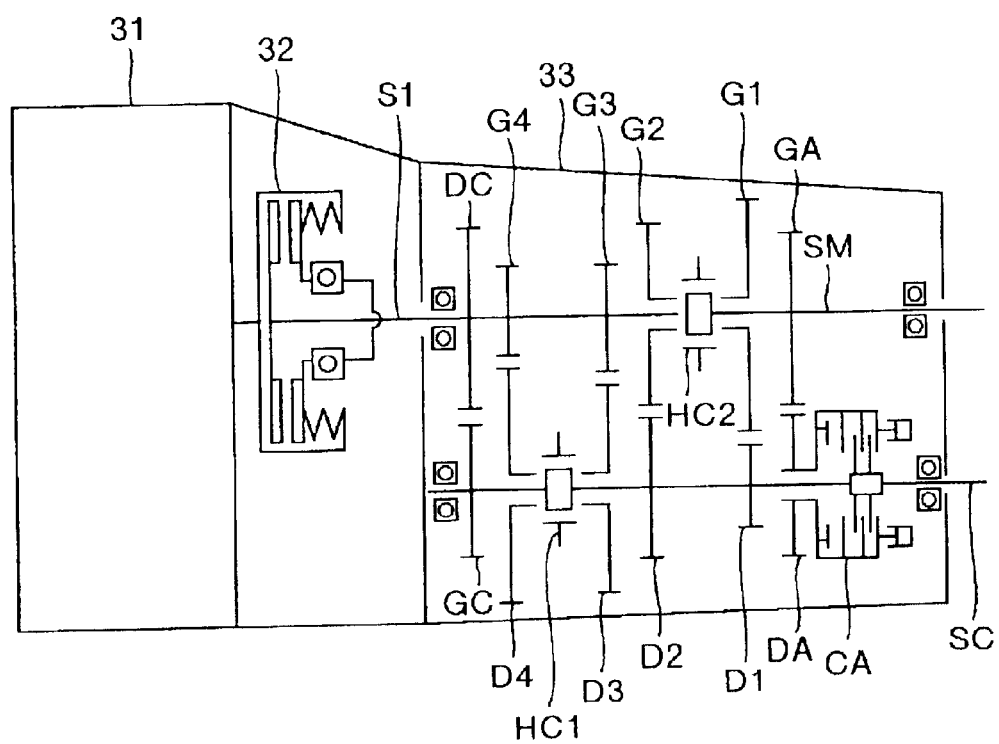
FIG. 6 is a view showing a configuration example of an automobile making use of an automatic transmission for automobiles, having a clutch according to the invention.

FIG. 6 shows a configuration example, in which the clutch according to the invention is used for a variable speed clutch in an automatic transmission for automobiles.

Output of an engine 31 is transmitted to a start clutch 32, and releasing and coupling motions of the start clutch 32 are controlled by an actuator (not shown). When the start clutch 32 is put in a coupled state, output of the engine 31 is transmitted to an input shaft SI of a transmission 33.

Arranged in the transmission 33 are a counter shaft SC and a main shaft SM, from which main shaft SM power is output to drive wheels (not shown) of an automobile. Rotation of the input shaft SI is transmitted to the counter shaft SC by a reduction gear set (DC, GC) within the transmission, and power is transmitted to the main shaft from the counter shaft through gear sets (D1-G1, D2-G2, D3-G3, D4-G4), which effect speed reduction (speed increase) conformed to respective speed levels.

The gear sets conformed to the respective speed levels are mounted in a manner to be able to idle on either of the counter shaft SC and the main shaft SM, and a first-speed clutch HC1 and a second-speed clutch HC2 are used to selectively control coupling and release on transmission of power between idling gears and associated shafts. The first-speed clutch HC1 and the second-speed clutch HC2 are operated by control actuators (not shown). Also, an assist gear set (DA-GA) is arranged to transmit power to the main shaft from the counter shaft, the gear DA on a counter shaft side is rotatably held on the counter shaft, and a clutch CA according to the invention is used to adjust power transmitted between the counter shaft and the gear DA.

A working oil fed from a hydraulic control unit (not shown) actuates a hydraulic piston of the clutch CA to control power transmitted by the clutch. Here, gears for reverse travel, gears for fourth or higher speeds, and power transmission courses therefor are not shown.

Figure 7:
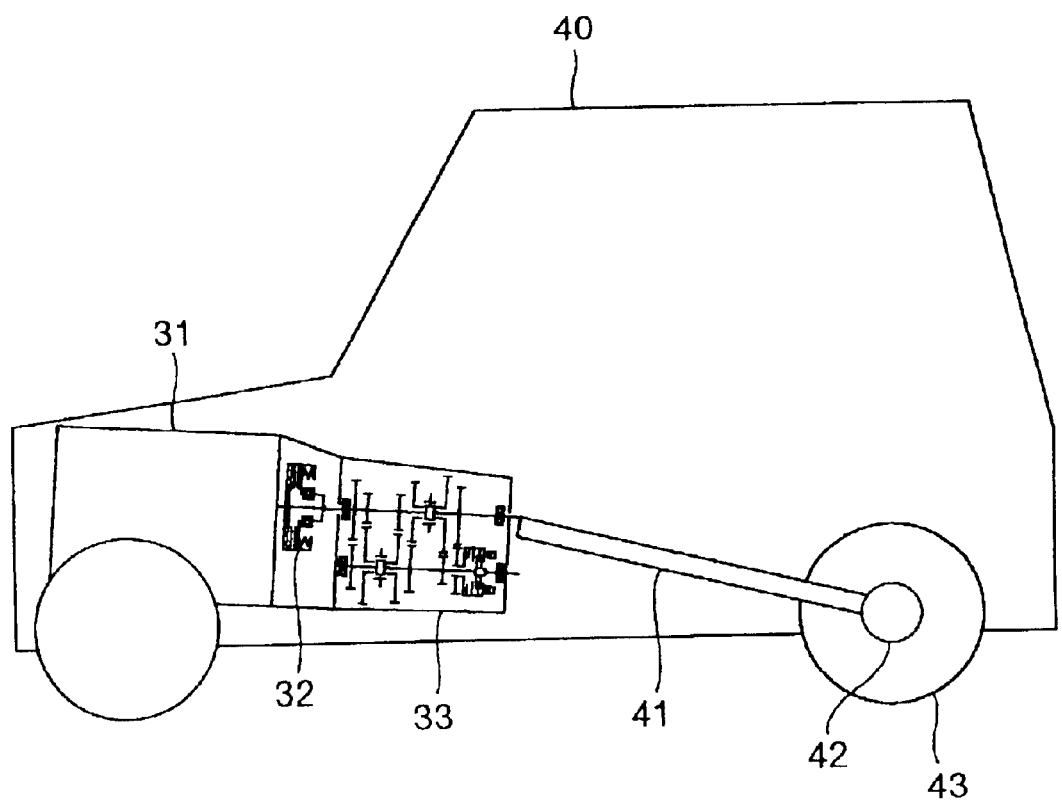
FIG. 7 is a view showing an embodiment of an automobile having a clutch according to the invention.

FIG. 7 shows a manner, in which the clutch is loaded on an automobile. Output of the transmission 33 is transmitted to a final gear 42 through a propeller shaft 41 to be changed in direction to be transmitted to driving wheels 43 to accelerate or decelerate the automobile 40.

An explanation will be given below to a motion of the clutch constructed in the above manner. Since the speed changing motion is the same, however, an explanation will be given to only a motion in the case where the first speed is changed to the second speed.

At the time of traveling at the first speed, the first-speed clutch HC1 is coupled with the first-speed gear G1, and so power of the engine 31 is transmitted via a path, which traces the start clutch 32, input shaft SI, reduction gear set (DC, GC), counter shaft SC, first-speed reduction gear set (D1-G1), first-speed clutch HC1, and the main shaft SM.

When changing to the second speed is to be effected, the clutch CA is maintained in a semi-coupled state to adjust power transmitted from the first-speed clutch HC1 to a low value. When power transmitted from the first-speed clutch HC1 has assumed a sufficiently low value, the first-speed clutch HC1 is operated to be cut off the first-speed gear G1.

Subsequently, the semi-coupled state of the clutch CA is adjusted so that the number of revolutions of the input shaft SI is adjusted relative to the number of revolutions of the main shaft SM to become one in the case where the second speed is used. When the number of revolutions of the input shaft SI has sufficiently approximated one in the case where the second speed is used, relative to the number of revolutions of the main shaft SM, the first-speed clutch HC1 is operated to be coupled with the second-speed gear G2. After the first-speed clutch HC1 has completed coupling with the second-speed gear G2, the clutch CA is released.

Hereupon, when controllability of the clutch CA is not appropriate, adjustment in the semi-coupled state is not smoothly made with the use of the clutch CA and power output from the main shaft SM is much varied, which greatly degrades the speed changing performance of an associated automatic transmission. The use of the clutch according to the invention makes it possible to make smooth adjustment in the semi-coupled state with the use of the clutch CA and prevent variation in power output from the main shaft SM.

As described above, it is possible according to the embodiment to improve controllability of the clutch, so that it is possible to prevent variation in power output from the main shaft SM and to constitute an automatic transmission of high quality for automobiles.

Also, when a clutch in an automatic transmission for automobiles involves dispersion in response, lag is generated in timing of transmission of power to appear as a disadvantage such as shock in changing of speed, or the like. Therefore, it is desirable to eliminate looseness of a mechanism responsible for dispersion in response of a clutch but it is difficult to eliminate such looseness because many parts of the clutch are rotating members formed to entail clearances for rotating movements. According to the invention, since a clutch acts in a manner to eliminate looseness therein in an initial stage of action, the clutch can ensure response in the same timing and so constitute an automatic transmission for automobiles, in which shock in changing of speed is suppressed to a small degree. Also, it is possible to constitute automobiles loaded with an automatic transmission.

According to the invention, a thrust force generated by a helical gear is transmitted to a stopper by a coupling means in an initial stage of coupling in a clutch to act in a manner to eliminate looseness in the clutch. Thereby, it is possible to eliminate looseness in the clutch to maintain timing, in which power transmitted rises and which would involve dispersion caused by looseness, constant. Accordingly, it is possible to constitute a clutch device of simple construction and high controllability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A clutch comprising:
   a first transmission member mounted on a shaft to be constrained in a direction of rotation;
   a second transmission member arranged to be coaxial with the first transmission member;

a helical gear which is arranged to be coaxial with the second transmission member and on which the second transmission member are mounted to be constrained in a direction of rotation;

an actuator to control a state of contact between the first and second transmission members; and a stopper which restricts positions of the first and second transmission members in an axial direction, wherein:

there is provided a transmission course which is distinguished from the first transmission and second transmission members and through which a thrust force generated on the helical gear is transmitted to the stopper, wherein the stopper is fixedly provided on the helical gear.

2. A clutch according to claim 1, wherein the helical gear and the stopper are formed integrally whereby the force transmission course is defined in the integrally formed member consisting of the helical gear and the stopper.

3. A clutch for automobiles according to claim 2, wherein the stopper is constructed to serve also as the second transmission member.

4. A clutch for automobiles, comprising:

a first transmission member mounted on a power transmission shaft to be constrained in a direction of rotation;

a second transmission member arranged to be coaxial with the first transmission member and to generate power transmitted between the first and second transmission members;

a helical gear arranged to be coaxial with the power transmission shaft and to be constrained relative to the second transmission member in a direction of rotation;

operating means for controlling a contact force between the first and second transmission members to control power transmitted therebetween; and a stopper to bear the force applied by the operating means, wherein:

the clutch further comprises a coupling means for transmitting an axial movement of the helical gear to the stopper, so that when power is transmitted between the power transmission shaft and the helical gear, a thrust force generated upon meshing of the helical gear causes the stopper to be directed toward a predetermined position.

5. A clutch for automobiles, comprising:

a first transmission member mounted on a power transmission shaft to be constrained in a direction of rotation;

a second transmission member arranged to be coaxial with the first transmission member and to generate power transmitted between the first and second transmission members;

a helical gear arranged to be coaxial with the power transmission shaft and to be constrained relative to the second transmission member in a direction of rotation;

operating means for controlling contact forces between the first and second transmission members to control powers transmitted therebetween; and a stopper to bear a force applied by the operating means, wherein:

the stopper and the helical gear are formed integrally to be a unitary member, so that a thrust force generated upon meshing of the helical gear causes the helical gear itself to be directed toward a predetermined position in an axial direction whereby the stopper is caused to be directed toward a predetermined position.

6. A clutch for automobiles, comprising:

a first transmission member mounted on a power transmission shaft to be constrained in a direction of rotation;

a second transmission member arranged to be coaxial with the first transmission member and to generate power transmitted between the first and second transmission members;

a helical gear arranged to be coaxial with the power transmission shaft and to be constrained relative to the second transmission member in a direction of rotation; and operating means for controlling contact forces between the first transmission member and the second transmission member to control powers transmitted therebetween, wherein:

the second transmission member and the helical gear are formed integrally to be a unitary member, so that a thrust force generated upon meshing of the helical gear causes the helical gear itself to be directed toward a predetermined position in an axial direction whereby the second transmission member is caused to be directed toward a predetermined position or positions.

7. A clutch according to claim 3, wherein a coupling means, for transmitting a thrust force from the helical gear to the stopper, is provided with a cushioning member, whereby transmission of a thrust force generated upon meshing of the helical gear is buffered.

* * * * *